Oct. 9, 1928.

A. R. RUTTER 1,686,641

WATTHOUR METER

Filed Oct. 16, 1925

WITNESSES:

INVENTOR
Argyle R. Rutter.
BY
ATTORNEY

Patented Oct. 9, 1928.

1,686,641

UNITED STATES PATENT OFFICE.

ARGYLE R. RUTTER, OF EAST PITTSBURGH, PENNSYLVANIA, ASSIGNOR TO WESTING-HOUSE ELECTRIC & MANUFACTURING COMPANY, A CORPORATION OF PENNSYLVANIA.

WATTHOUR METER.

Application filed October 16, 1925. Serial No. 62,751.

My invention relates to electrical measuring instruments, and particularly to induction meters of the watthour type for alternating-current circuits.

One object of my invention is to provide a device of the above-indicated character that shall more accurately register the quantities which it is adapted to measure.

Another object of my invention is to provide an induction watthour meter that shall compensate for the drooping characteristic on overload of meters of this character.

In the usual alternating-current watthour meters, the accuracy of operation thereof is seriously affected by series damping under varying load conditions, particularly in case of overloads where the registration curve falls off rapidly.

In such instruments, the registration is incorrect when the load varies because the damping action varies as the square of the change in the line current and the torque varies only directly as the change in the current.

This condition, particularly in domestic service where overloads of variable values are becoming more prevalent, is objectionable and it is of increasing importance that it be obviated.

Accordingly, in practicing my invention, I provide a meter in which, by the provision of means for varying or unbalancing the series flux, the registration curve is prevented from drooping by any appreciable or serious amount and the accuracy of the meter is improved.

Figure 1:
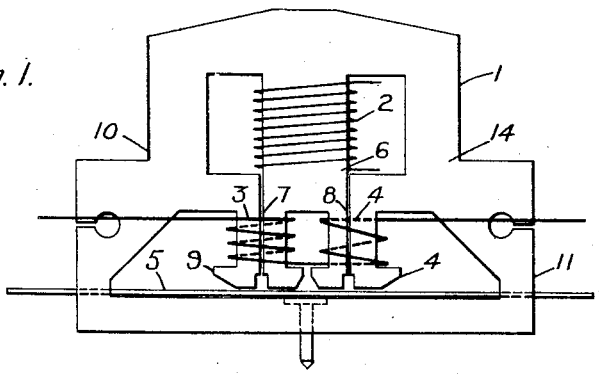
Figure 2:
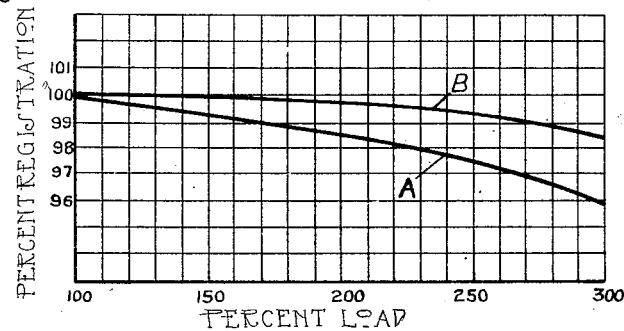

Figure 1 of the accompanying drawings is a diagrammatic view of a watthour meter constructed in accordance with my invention, and Fig. 2 is a diagram of curves showing a comparison of the operation of my improved meter to one of a usual type.

In Fig. 1, an actuating electromagnet core member 1 of a watthour meter is shown, with a voltage coil 2 and a current coil having two parts 3 and 4, and an armature 5 for operation thereby.

The core member 1 is of a usual type comprising a central or shunt leg 6 on which the voltage coil 2 is disposed, and spaced lower projecting portions 7 and 8. The portion 7 is paired with a similar portion 9 supported from one side portion 10 of the core member in spaced relation thereto to constitute a series pole piece, as is also the portion 8 paired with a portion 4 supported from another side 14 of the core member to constitute the other series pole piece.

The part 3 of the series coil is disposed around the core portions 7 and 9 and the part 4 of the series coil is disposed around the core portions 4 and 8.

If as in a usual watthour meter, the parts 4 and 3 of the coil comprise equal numbers of turns, a meter of usual character, having a drooping characteristic curve, as indicated by a curve A in Fig. 2, is obtained.

The characteristic curves A and B shown in Fig. 2 are obtained by plotting percent registration of a meter as ordinates against percent load being measured by the meter as abscissas. As the load being measured by the meter increases from zero, an ideal meter would have a characteristic curve that coincides with the 100% registration abscissa, but this is not possible because of the damping on the armature due to the increase in the series flux, as hereinbefore set forth.

However, in accordance with my invention, I have found that by selecting the proper series pole portions 7—9 or 8—4 and suitably adjusting the number of the series-coil division turns relative to the other, the registration curve can be caused to assume the form shown by the curve B in Fig. 2. In this instance, the part or division 3 of the series coil contains the usual number of turns and the number of turns in the part 4 is reduced. Obviously, however, various combinations of the relative number of turns in the parts or divisions 3 and 4 may be selected, including the entire omission of turns on one of the pole portions, to obtain a certain characteristic or one suited to a particular circuit.

By this simple expedient, a watthour, a volt-ampere-hour, a reactive-component or similar meter may be constructed from standard parts and at very little expense to operate very materially better than meters of the prior art.

Further, by my invention, the registration curve is not appreciably affected at low loads but is very definitely modified to raise the same at overloads and to thus, compensate for the drooping effect present in meters of usual forms which is caused by the series flux.

While I have shown and described a particular form of my invention, it is obvious that the desired result may be obtained by other methods and therefore changes may be effected therein without departing from the spirit and scope thereof, as set forth in the appended claims.

I claim as my invention:

1. A meter comprising a movable element, a magnetizable core and windings on said core energized in accordance with different quantities of a circuit for actuating the element, one of said windings including two divisions having different numbers of turns in series circuit relation with the circuit.

2. A meter comprising a movable element and windings energized in accordance with the current and voltage of a circuit, respectively, and a magnetizable core for the current winding, said current winding including two divisions having different numbers of turns in series circuit relation.

3. A meter comprising a rotatable armature, an electro-magnetic core structure having two series pole portions and a shunt pole portion disposed between the two series pole portions, a voltage winding on the shunt pole portion and current windings in series circuit relation on said series pole portions having different numbers of turns, respectively, for compensating said armature for overload damping.

4. A meter comprising a movable element, an actuating electromagnet structure therefor having two series pole portions and a shunt pole portion disposed between the two series pole portions, and means for effecting unbalanced fluxes between said series pole portions to compensate for the series damping effect.

5. In an induction meter having an armature, the combination with means for producing coacting current and voltage fluxes for exerting a torque on said armature, of means for causing said coacting fluxes to traverse spaced paths through said armature, said means including an electromagnetic core and means for causing an unbalance of the fluxes in said paths upon an increase of one of said fluxes, said means including an unequally distributed current winding.

6. In an induction meter having an armature, the combination with means for producing coacting fluxes for exerting a torque on said armature, of means for causing the coacting fluxes to traverse spaced paths through said armature, said means including an electromagnetic core, and means for causing the coacting fluxes in said spaced paths to increase in unequal ratios with an increase in one of said fluxes, whereby an unbalance is effected between the coacting fluxes in the spaced paths, said last named means including only a series winding.

7. In an induction meter having an armature, the combination with means for producing coacting fluxes for exerting a torque on said armature, of means for causing the coacting fluxes to traverse spaced paths through said armature, said means including an electromagnetic core having a plurality of pole portions adjacent said armature, and means for causing the coacting fluxes traversing one flux path to increase at a greater rate than the coacting fluxes traversing another flux path with an increase in one of said fluxes.

8. In an induction meter having an armature, the combination with means for producing coacting fluxes for exerting a torque on said armature, of means for causing the coacting fluxes to traverse spaced paths through said armature, said means including an electromagnetic core having a plurality of pole portions adjacent said armature provided with a return flux path member, and a winding on each of said polar portions, said windings having different numbers of turns.

9. In an induction meter having an armature, the combination with means for producing coacting fluxes for exerting a torque on said armature, of means for causing the coacting fluxes to traverse spaced paths through said armature, said means including an electromagnetic core having a plurality of pole portions adjacent said armature and a return flux path member for said pole portions, and means for causing an unbalance of the coacting fluxes in said spaced paths with an increase in one of said fluxes, said means including a current winding distributed unequally between said pole portions.

10. In an induction meter having an armature, the combination with means for producing coacting fluxes for exerting a torque on said armature, of means for causing the coacting fluxes to traverse spaced paths through said armature, said means including an electromagnetic core having a plurality of pole portions adjacent said armature provided with a return flux path member, and a main current series winding distributed on said pole portions whereby the coacting fluxes traversing the spaced paths increase at different rates with increase in one flux of said fluxes.

11. In an induction meter having an armature, the combination with means including current and voltage windings for producing coacting fluxes for exerting a torque on said armature, of means for causing the armature to turn compensated for series damping, said means including a current winding divided into two spaced sections adjacent the armature, one section having a greater number of turns than the other section.

12. In an induction meter having an armature, the combination with means for producing coacting fluxes for exerting a torque on said armature, of means for causing the coacting fluxes to traverse spaced paths through said armature, said means including an electromagnetic core and a current winding for causing an unbalance between the coacting fluxes traversing said paths with an increase of one of said fluxes.

13. In an induction meter having an armature, the combination with means for producing coacting fluxes for turning said armature, of means for causing said coacting fluxes to act on said armature at a plurality of positions thereon, and means for improving the operation of said meter at overloads including a current winding having a section adjacent each of said positions on said armature, said sections having an unequal number of turns.

In testimony whereof, I have hereunto subscribed my name this 8th day of October 1925.

ARGYLE R. RUTTER.